United States Patent [19]

Hedman

[11] 4,367,607
[45] Jan. 11, 1983

[54] WEEDLESS, CHANGEABLE PLASTIC LURE

[76] Inventor: Dean L. R. Hedman, 4410 NW. 61st St., Des Moines, Iowa 50322

[21] Appl. No.: 182,686

[22] Filed: Aug. 29, 1980

Related U.S. Application Data

[63] Continuation-in-part of Ser. No. 888,853, Mar. 22, 1978, Pat. No. 4,219,956.

[51] Int. Cl.³ .................... A01K 85/00; A01K 83/06
[52] U.S. Cl. .................... 43/42.1; 43/42.24; 43/42.29; 43/44.8
[58] Field of Search .................... 43/42.39, 44.2, 44.6, 43/44.8, 42.09, 42.1, 42.24, 42.28, 42.29, 42.37, 42.38, 43.2, 44.81, 43.16

[56] References Cited

U.S. PATENT DOCUMENTS

| | | | |
|---|---|---|---|
| 852,793 | 5/1907 | Ladish | 43/44.8 |
| 1,457,926 | 6/1923 | Dunkelberger | 43/42.37 |
| 1,485,643 | 3/1924 | Streich | 43/42.37 |
| 1,538,909 | 5/1925 | Shannon | 43/42.29 |
| 1,644,151 | 10/1927 | Rodgers | 43/42.24 |
| 2,295,765 | 9/1942 | Weber | 43/42.28 |
| 3,724,116 | 4/1973 | Lindner | 43/44.8 |
| 3,731,419 | 5/1973 | Candy | 43/42.28 |
| 3,990,171 | 11/1976 | Davis | 43/42.28 |
| 4,074,454 | 2/1978 | Cordell | 43/42.29 |
| 4,244,133 | 1/1981 | Martinek | 43/42.39 |

Primary Examiner—Nicholas P. Godici
Assistant Examiner—Charles L. Willis
Attorney, Agent, or Firm—Zarley, McKee, Thomte, Voorhees & Sease

[57] ABSTRACT

A fishhook includes a jig head of weighted or floatable material with a rearwardly extending retainer received in the forward end of a pliable plastic body element. The retainer includes a return bend which merges into a laterally upwardly extending straight portion onto which the body element is first threaded followed by the hook being passed through the middle portion of the body in the plane of top and bottom longitudinally extending grooves with the barbed portion of the hook being substantially concealed within the top groove. The jig head includes oppositely disposed longitudinally extending slots which receive the wings of a slotted vane blade extending forwardly and upwardly from the jig head.

17 Claims, 12 Drawing Figures

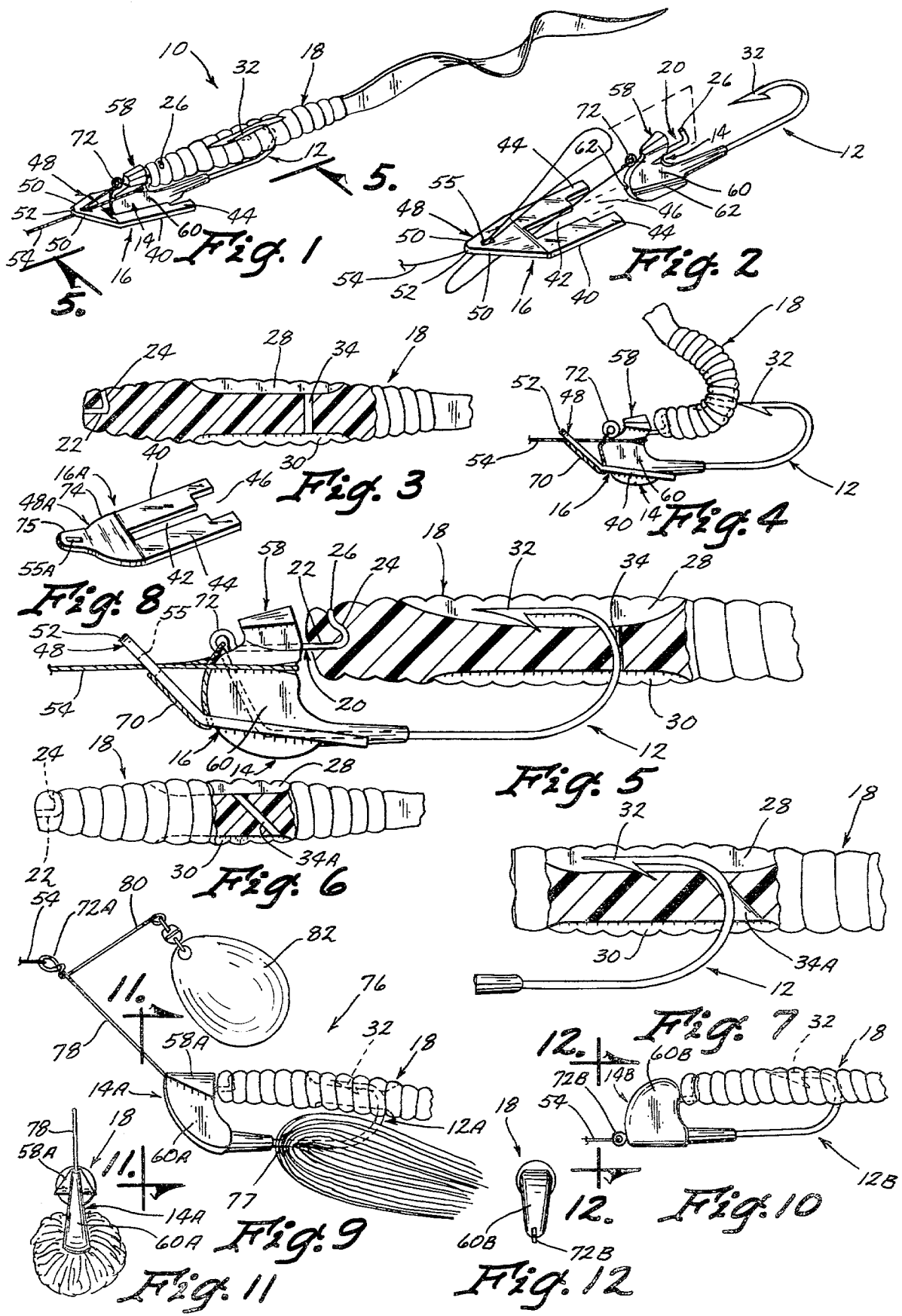

4,367,607

WEEDLESS, CHANGEABLE PLASTIC LURE

This is a continuation-in-part application of Ser. No. 888,853, filed Mar. 22, 1978, entitled WEEDLESS, CHANGEABLE PLASTIC LURE, now U.S. Pat. No. 4,219,956, Sept. 2, 1980.

BACKGROUND OF THE INVENTION

The disclosure of my prior U.S. Pat. No. 4,219,956, Sept. 2, 1980, is incorporated by reference. This application includes certain improvements and additional features.

The pliable body member must be easily attached to and removed from the retainer extending rearwardly from the jig head and must stay in place during use. The body member should be usable with hooks having different lengths and the barb should be unexposed to avoid being caught on foreign objects in the water but yet be readily exposable when the fish bites upon the hook. The plastic pliable body member should be maintained in its position of use throughout its operation.

An optional vane blade is desired to give the lure swimming-like action when pulled through the water. The vane blade must be easily attached and removed and securely held in place when being used.

A jig head for a spinner blade type lure utilizing the retainer and pliable plastic body is desired as is a floatable type jig head for certain occasions of use.

SUMMARY OF THE INVENTION

Common to the several embodiments of the invention disclosed is the retainer element and the pliable plastic body secured to the retainer and the barbed portion of the hook. The retainer extends rearwardly from the jig head and is threaded thereon at the longitudinal center of the jig head and thence extends upwardly laterally to the outside surface. A return bend portion merges into a straight laterally extending portion. The bend portion functions like a hook to engage the pliable plastic material and hold the body member firmly in place such that it does not become disengaged during use. The straight laterally extending portion facilitates threading the body member onto and off of the retainer. The body member has alignment slots on the top and bottom and the barbed portion of the hook rests in the top slot just below the surface of the body member so that it does not engage brush and rocks in the water as the lure is pulled through the water. A fish can easily depress the body member and be hooked. A diagonally extending passageway through the body member can be formed to increase the frictional engagement on the hook to hold it in place, if desired.

To provide the swimming type action for the lure as it is pulled through the water, a forwardly and upwardly extending vane can be removably mounted on the jig head which includes oppositely disposed longitudinally extending slots which receive the oppositely disposed wings of the vane blade. The line is threaded through an aperture in the forward end of the vane blade thence around the jig head having the retainer and back out the same aperture thence upwardly through the slot in the vane blade where it is anchored to the eye of the hook. This securely holds the vane blade in place.

A spinning blade type lure and a floatable type lure are also possible using the retainer and the pliable plastic body.

The jig head may have several different configurations and common to the weighted type lures is a crown which increases in width downwardly and then merges into the lower body portion which is thinner at the top but increases in width downwardly. The floatable jig head lacks a crown but decreases in thickness from the top to the bottom to maintain the proper orientation of the lure when floating in the water. The thicker weighted portion of the weighted lures also keeps the proper orientation for the lure when it is at the bottom and the crown portions facilitate the lure moving through tight brush and rock type conditions.

One embodiment of the vane blade includes a nose portion which tapers uniformly to a point at the forwardmost end while a second embodiment includes a forwardly extending finger which facilitates the lure threading its way through a crowded environment in the water.

DESCRIPTION OF THE DRAWINGS

FIG. 1 is a perspective view of the weedless, changeable plastic lure of this invention including a vane blade.

FIG. 2 is an exploded perspective view thereof.

FIG. 3 is a flagmentary cross-sectional view of the pliable plastic body.

FIG. 4 is a side elevational view illustrating the pliable plastic body being threaded onto the retainer and the hook.

FIG. 5 is a cross-sectional view taken along line 5—5 in FIG. 1.

FIG. 6 is a fragmentary side elevation view of the pliable plastic body having a diagonally extending transverse opening for the hook.

FIG. 7 is a view similar to FIG. 6 showing the hook in the diagonally extending passageway.

FIG. 8 is a perspective view of an alternate embodiment of the vane blade shown in FIGS. 1-5.

FIG. 9 is a side elevational view of a spinner-type lure.

FIG. 10 is a side elevational view of a floatable lure.

FIG. 11 is a cross-sectional view taken along line 11—11 in FIG. 9.

FIG. 12 is a cross-sectional view taken along line 12—12 in FIG. 10.

DESCRIPTION OF THE PREFERRED EMBODIMENT

The weedless, changeable plastic lure of FIG. 1 is referred to generally by reference numeral 10 and includes a hook 12 having a jig head 14 on which a vane blade 16 is mounted. A pliable plastic body 18 extends from a retainer element 20 to engagement with the hook 12.

The retainer 20 is best illustrated in FIG. 5 and includes a straight rearwardly extending portion 22 which merges into a return bend portion 24 which in turn merges into a laterally upwardly extending straight portion 26. The return bend portion functions like a fishhook to engage the pliable plastic material and lock it in place on the retainer 20 although the body member can be easily threaded onto and off of the retainer. The laterally extending straight portion 26 facilitates the threading action and terminates just short of the outside of the surface of the plastic body 18.

The plastic body 18 includes top and bottom alignment grooves or slots 28 and 30, respectively, with the top slot also functioning to receive the barbed portion 32 of the hook 12 and conceal it from being exposed to foreign debris in the water. A slight pressure upon the pliable plastic body 18 will depress it sufficiently for the fish to be engaged by the barbed portion 32. The elongated slots 28 and 30 facilitate the body member 18 being used on hooks of different lengths. It is noted that the top slot 28 is slightly deeper than the bottom slot 30 in order to accommodate the height of the barbed portion 32. A laterally extending passageway 34 is formed through the body member 18 and may be diagonal in orientation as seen at 34A in FIGS. 6 and 7 thereby imposing frictional forces on the hook 12, as seen in FIG. 7, to further assist in maintaining the body 18 stationary relative to the hook 12 during use.

In FIG. 4 the body member 18 is being threaded first onto the retainer by the straight portion 26 being inserted into the axial center of the body member and then to the position as seen in FIG. 5. The body member is then laid across the hook 12 and the length of the hook is noted on the body member whereupon the pointed barbed portion 32 is pushed through the body member to form the passageway 34 or 34A as particularly shown in FIG. 4 where this action is about to begin. It is seen then that any number of different shaped body members 18 having different colors or the like, can be readily used and the same body member can be reused numerous times.

On occasion it may be desirable to have a lure with a swimming type action as it is pulled through the water and thus the vane blade 16 may be added to the jig head 14. The vane blade includes a main body portion 40 including a longitudinally extending center slot 42 which forms wing portions 44. The slot 42 is enlarged at the rear 46. A nose 48 extends forwardly and upwardly and includes side edges 50 which taper to a pointed end 52. An aperture 55 is provided through which a line 54 extends and is described in greater detail hereinafter.

The jig head 14 includes a crown 58 having a rounded top surface with the crown increasing in thickness downwardly where it merges into the upper end of a lower jig head body portion 60 which uniformly increases in thickness from the top downwardly. The top end of the lower portion 60 is thinner than the bottom of the crown 58. The shape of the crown 58 facilitates threading the lure through tight conditions in the water and the heavier lower portion maintains the lure properly oriented. The material may be lead or the like.

A pair of oppositely disposed longitudinally forwardly and upwardly extending slots 62 are provided in the lower body portions 60 of the jig head 14 which receive the inside edges of the wing portions 44 of the vane blade 16.

The vane blade 16 is detachably locked in place on the jig head 14 by the line 54 being threaded through the aperture 55 thence around the crown 58 below the retainer 20, as seen in FIG. 5, thence back out through the aperture 55 and downwardly at 70 through the slot 42 and it is then anchored at the eye 72 just forwardly of the crown 58.

An alternate embodiment 16A of the vane blade is shown in FIG. 8 and includes a nose 48A having rounded forwardly tapering side edges 74 which merge into a forwardly extending finger 75 including the aperture 55A. The finger 75 facilitates moving the lure through the crotch of branches of the like.

In FIGS. 9 and 11, a spinner-type lure 76 is shown which includes the body member 18. The jig head 14A is constructed somewhat differently but includes a downwardly tapering crown 58A having straight side edges which merge into the lower body portion 60A, as seen in FIG. 11, which is thinner than the lower end of the crown 58A but becomes wider downwardly.

A skirt 77 is mounted on the hook 12A and a wire leader 78 extends upwardly and forwardly from the forwardmost upper corner of the jig head 14A. The line 54 is connected to an eye 72A which includes a rearwardly extending arm 80 carrying a spinner blade 82.

A floater type lure is shown in FIGS. 10 and 12 and includes the plastic pliable body member 18. A balsa wood type jig head 60B is mounted on the forward end of the hook 12B and as seen in FIG. 12, is thicker at the top and tapers to a thinner width at the bottom to maintain proper lure orientation in the water due to the buoyancy of the jig head 60B. This shape also facilitates threading the lure through crowded unwater environment. The eye 72B is positioned directly ahead of the jig head 62 in line with the main body of the hook 12B and is connected to the line 54.

It is thus seen that numerous optional arrangements are possible utilizing the teachings of this invention but common to all is the retainer 20 which facilitates the positive retention of the pliable plastic body 18 when in use but also makes it easy to remove when desired. The slots 28 and 30 not only facilitate threading the body member onto the barbed portion of the hook but conceal the barbed portion to provide the weedless feature of the lure. The specially designed jig heads also facilitate threading the lure through the foreign elements in the water and give it the proper orientation while the vane blade gives the lure swimming action, if desired. The vane blade also slows the descent of the lure into the water making it appear more natural. Furthermore, when the lure is retrieved the blade pushes against the water and tends to maintain the lure in the water at a desired level.

I claim:

1. A weedless fish lure comprising,
    a hook means having a shank portion with forward and rearward ends, a pointed arcuate hook portion with a rearwardly disposed barb element connected to the pointed end of said hook portion and the other end of said hook portion connected to said rearward end of said shank portion and an eyelet connected to said forward end of said shank portion,
    a pliable body member having forward and rearward ends with a middle portion therebetween, and
    retainer means rigidly connected to said shank portion being in lateral spaced relation to said shank portion and including a substantially straight portion operatively extending rearwardly from the forward end of said shank portion into the forward end of said body member along its longitudinal center axis and thence laterally outwardly to detachably secure said forward end of said body member to said shank portion with said hook portion extending into said middle portion of said body member, said straight portion of said retainer means merging into a return bend portion terminating in an end laterally spaced from said straight portion to provide a substantial hook-like means for holding engagement with said pliable member.
2. The structure of claim 1 wherein said return bend is curved.
3. The structure of claim 1 wherein said hook portion extends upwardly from said shank portion and said laterally outwardly extending portion is straight and extends upwardly for threading said pliable body member on said element.

4. The structure of claim 1 wherein said shank portion includes a jig head of floatable material and said jig head uniformly tapers from an upper wider portion to a thinner lower portion with said eyelet being in the lower portion and said retainer means being in the upper wider portion.

5. The structure of claim 1 wherein said return bend terminates in a portion extending laterally outwardly of said straight portion and substantially perpendicular thereto.

6. A weedless fish lure comprising,
   a hook means having a shank portion with forward and rearward ends, a pointed arcuate hook portion with a rearwardly disposed barb element connected to the pointed end of said hook portion and the other end of said hook portion connected to said rearward end of said shank portion and an eyelet connected to said forward end of said shank portion,
   a pliable body member having forward and rearward ends with a middle portion therebetween, and
   retainer means operatively extending rearwardly from the forward end of said shank portion into the forward end of said body member to detachably secure said forward end of said body member to said shank portion with said hook portion extending into said middle portion of said body member,
   said shank portion including a jig head and said eyelet being positioned forwardly of said jig head with said retainer means being positioned rearwardly of said jig head, said jig head having oppositely disposed longitudinally extending slots, and
   a forwardly extending vane blade having a main body portion and an upwardly and forwardly extending nose portion, said main body portion including a longitudinally extending center slot in which said jig head is removably received with said vane blade main body having side wing portions removably received in said slots in said jig head, said nose portion of said vane blade having an aperture forwardly of said eyelet through which a line extends for connection to said eyelet.

7. The structure of claim 6 wherein said nose on said vane blade includes straight side edges which extend from said main body and converge at the forwardmost point on said vane blade.

8. The structure of claim 6 wherein said nose on said vane blade includes front and rear portions with said rear portion having side edges which converge towards said front portion which has substantially parallel forwardly extending side edges terminating in a forwardmost end on said vane blade.

9. The structure of claim 6 wherein said jig head includes upper and lower portions with said eyelet being at the upper portion and said oppositely disposed slots being in the lower portion and said line extending rearwardly through said aperture around the upper portion of said jig head and thence returning through said aperture and around at least part of said nose portion and thence to said eyelet.

10. The structure of claim 6 wherein said nose portion is inclined relative to said main body portion.

11. A weedless fish lure comprising,
    a hook means having a shank portion with forward and rearward ends, a pointed arcuate hook portion with a rearwardly disposed barb element connected to the pointed end of said hook portion and the other end of said hook portion connected to said rearward end of said shank portion and an eyelet connected to said forward end of said shank portion,
    a pliable body member having forward and rearward ends with a middle portion therebetween,
    retainer means operatively extending rearwardly from the forward end of said shank portion into the forward end of said body member to detachably secure said forward end of said body member to said shank portion with said hook portion extending into said middle portion of said body member, and
    said body including top and bottom longitudinal alignment grooves through which said hook portion extends with the barb element being disposed substantially in said top groove.

12. The structure of claim 11 wherein said hook portion extends between said top and bottom grooves at angle to a perpendicular line between said grooves to cause said pliable body member to press against said hook portion to frictionally hold said body member with said barb element in said top groove.

13. A weedless fish lure comprising,
    a hook means having a shank portion with forward and rearward ends, a pointed arcuate hook portion with a rearwardly disposed barb element connected to the pointed end of said hook portion and the other end of said hook portion connected to said rearward end of said shank portion and an eyelet connected to said forward end of said shank portion,
    a pliable body member having forward and rearward ends with a middle portion therebetween, and
    retainer means operatively extending rearwardly from the forward end of said shank portion into the forward end of said body member to detachably secure said forward end of said body member to said shank portion with said hook portion extending into said middle portion of said body member, said retainer means comprising an element extending rearwardly having a return bend portion terminating in an end laterally spaced from said element to provide a substantial hook-like means for engagement with said pliable body member,
    the forward end of the shank portion of said hook means including a forwardly extending vane blade having a main body portion and an upwardly and forwardly extending nose portion,
    said shank portion including a jig head having oppositely disposed longitudinally extending slots and said vane blade including a longitudinally extending center slot in which said jig head is received with said vane blade main body having side wing portions received in said slots in said jig head,
    said jig head including upper and lower portions with said eyelet being at the upper portion and said oppositely disposed slots being in the lower portion and said nose portion of said vane blade having an aperture forwardly of said eyelet through which a line extends rearwardly around the upper portion of said jig head and thence returns through said aperture downwardly and rearwardly and through the center slot in the vane blade to said eyelet.

14. A weedless fish lure comprising,
    a hook means having a shank portion with forward and rearward ends, a pointed arcuate hook portion with a rearwardly disposed barb element connected to the pointed end of said hook portion and the other end of said hook portion connected to said rearward end of said shank portion and an eyelet connected to said forward end of said shank portion, a pliable body member having forward are rearward ends with a middle portion therebetween, and retainer means operatively extending rearwardly from the forward end of said shank portion into the forward end of said body member to detachably secure said forward end of said body member to said shank portion with said hook portion extending into said middle portion of said body member, said retainer means comprising an element extending rearwardly having a return bend portion terminating in an end laterally spaced from said element to provide a substantial hook-like means for engagement with said pliable body member, said shank portion including a jig head and said eyelet being positioned forwardly of said jig head with said retainer means being positioned rearwardly of said jig head, said jig head including a crown which increases in width from the top to the bottom and the remainder of the jig head increasing in width from the top to the bottom with the top of the remainder being substantially narrower in width than the bottom of the crown.

15. The structure of claim 14 wherein said eyelet is further defined as being positioned upwardly of said jig head and having a rearwardly extending arm connected thereto on which a blade element freely hangs.

16. A weedless fish lure comprising, a hook means having a shank portion with forward and rearward ends, a pointed arcuate hook portion with a rearwardly disposed barb element connected to the pointed end of said hook portion and the other end of said hook portion connected to said rearward end of said shank portion and an eyelet connected to said forward end of said shank portion, a pliable body member having forward and rearward ends with a middle portion therebetween, and retainer means operatively extending rearwardly from the forward end of said shank portion into the forward end of said body member to detachably secure said forward end of said body member to said shank portion with said hook portion extending into said middle portion of said body member, said shank portion including a jig head and said eyelet being positioned forwardly of said jig head with said retainer means being positioned rearwardly of said jig head, said jig head having oppositely disposed longitudinally extending slots, and a forwardly extending vane blade having a main body portion and an upwardly and forwardly extending nose portion, said main body portion including a longitudinally extending center slot in which said jig head is received with said vane blade main body having side wing portions received in said slots in said jig head, said jig head including upper and lower portions with said eyelet being at the upper portion and said oppositely disposed slots being in the lower portion and said nose portion of said vane blade having an aperture forwardly of said eyelet through which a line extends rearwardly around the upper portion of said jig head and thence returns through said aperture downwardly and rearwardly and through the center slot in the vane blade to said eyelet.

17. A weedless fish lure comprising, a hook means having a shank portion with forward and rearward ends, a pointed arcuate hook portion with a rearwardly disposed barb element connected to the pointed end of said hook portion and the other end of said hook portion connected to said rearward end of said shank portion and an eyelet connected to said forward end of said shank portion, a pliable body member having forward and rearward ends with a middle portion therebetween, and retainer means operatively extending rearwardly from the forward end of said shank portion into the forward end of said body member to detachably secure said forward end of said body member to said shank portion with said hook portion extending into said middle portion of said body member, said shank portion including a jig head and said eyelet being positioned forwardly of said jig head with said retainer means being positioned rearwardly of said jig head, said jig head having oppositely disposed longitudinally extending slots, and a forwardly extending vane blade having a main body portion and an upwardly and forwardly extending nose portion, said main body portion including a longitudinally extending center slot in which said jig head is received with said vane blade main body having side wing portions received in said slots in said jig head, said jig head including a crown which increases in width from the top to the bottom and the remainder of the jig head increases in width from the top to the bottom with the top of the remainder being substantially narrower in width than the bottom of the crown.

* * * * *